(12) United States Patent
Wang et al.

(10) Patent No.: US 9,292,139 B2
(45) Date of Patent: Mar. 22, 2016

(54) CAPACITIVE IN-CELL TOUCH SCREEN PANEL AND DISPLAY DEVICE

(71) Applicant: Beijing BOE Optoelectronics Technology Co., Ltd., Beijing (CN)

(72) Inventors: Haisheng Wang, Beijing (CN); Xiaoliang Ding, Beijing (CN); Cheng Li, Beijing (CN); Xue Dong, Beijing (CN); Hongjuan Liu, Beijing (CN); Shengji Yang, Beijing (CN); Weijie Zhao, Beijing (CN); Yingming Liu, Beijing (CN); Tao Ren, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 277 days.

(21) Appl. No.: 13/964,557

(22) Filed: Aug. 12, 2013

(65) Prior Publication Data

US 2014/0062944 A1 Mar. 6, 2014

(30) Foreign Application Priority Data

Sep. 3, 2012 (CN) .......................... 2012 1 0321910

(51) Int. Cl.
*G06F 3/041* (2006.01)
*G06F 3/044* (2006.01)

(52) U.S. Cl.
CPC .............. *G06F 3/044* (2013.01); *G06F 3/0412* (2013.01); *G06F 3/0416* (2013.01); *G06F 2203/04112* (2013.01)

(58) Field of Classification Search
None
See application file for complete search history.

(56) References Cited

U.S. PATENT DOCUMENTS

2011/0310057 A1* 12/2011 Wang ............................ 345/174
2012/0056835 A1* 3/2012 Choo et al. .................... 345/173
2012/0105338 A1* 5/2012 Lin et al. ........................ 345/173
2012/0242597 A1* 9/2012 Hwang et al. ................. 345/173
2014/0048854 A1* 2/2014 Wang et al. ................... 257/254
2014/0160061 A1* 6/2014 Kim et al. ..................... 345/174

FOREIGN PATENT DOCUMENTS

CN 102436107 A 5/2012
CN 202736016 U 2/2013

OTHER PUBLICATIONS

First Office Action issued by the The State Intellectual Property Office of the People's Republic of China in priority application No. 201210321910.0, dated Oct. 30, 2014; 6 pages.

(Continued)

*Primary Examiner* — Seokyun Moon (57) ABSTRACT

A capacitive in-cell touch screen panel and a display apparatus are disclosed in present disclosure. At least one touch control inducting electrode is disposed on the color film substrate and at least one touch control driving electrode is disposed on the TFT array substrate. Each of the touch control driving electrodes overlaps with multiple sets of gate lines in the TFT array substrate, respectively, and each of the touch control driving electrodes comprises touch control driving sub-electrodes disposed along the row direction and a driving control unit is disposed at the connection of each of the touch control driving sub-electrodes and each set of gate lines. Since the driving control unit is able to release the display driving signal delivered by the gate line after it is loaded to the touch control driving sub-electrodes, which is equivalent to the situation where a driving pulse is loaded on the touch control driving sub-electrodes, so that the multiple sets of gate lines overlapping with the touch control driving electrodes input the touch control driving signal sequentially to the touch control driving electrodes through the driving control unit, and thus a plurality of driving pulses can be loaded on the touch control driving sub-electrodes, increasing the frequency of the touch control driving signal loaded on the touch control driving electrodes.

20 Claims, 6 Drawing Sheets

(56) References Cited

OTHER PUBLICATIONS

English Translation of First Office Action issued by the The State Intellectual Property Office of the People's Republic of China in priority application No. 201210321910.0, dated Oct. 30, 2014; 5 pages.

English Abstract of CN102436107A (listed under Foreign Patent Documents) above; 1 page.

English Abstract of CN20273601U (listed under Foreign Patent Documents) above; 1 page.

* cited by examiner

CAPACITIVE IN-CELL TOUCH SCREEN PANEL AND DISPLAY DEVICE

CROSS REFERENCE TO RELATED APPLICATIONS

This application claims priority from Chinese National Application No. 201210321910.0, filed on Sep. 3, 2012, the contents of which are incorporated herein by reference.

FIELD OF DISCLOSURE

The present disclosure relates to a field of a display technology, and in particular to a capacitive in-cell touch screen panel and display device.

BACKGROUND

As the display technology is in a fast development, the touch screen panel has been gradually widespread in people's life. The current touch screen panel can be classified into add-on mode touch panel, on-cell touch panel and in-cell touch panel in accordance with the composing structure. Among these, the touch screen and the liquid crystal display (LCD) of the add-on mode touch panel are produced separately and then jointed together to be a liquid crystal display with touch functions. The add-on mode touch panel has the disadvantage of high fabricating cost, low optical transmittance, thick module, etc. While in the in-cell touch panel, the touch control electrode of the touch screen panel is embedded inside the liquid crystal display, thus thinning the thickness of the entire module and significantly reducing the fabricating cost of the touch screen panel, which is favored by various panel manufacturers.

In present, the existing capacitive in-cell touch screen panel is implemented by adding touch control scanning lines and touch control inducting lines directly on the existing an array substrate of Thin Film Transistors (TFT). That is, two layers of intersecting strip-shaped Indium Tin Oxides (ITO) electrodes in different planes are made on the surface of the TFT array substrate. The two layers of ITO electrodes are used as a touch control driving line and a touch control inducting line of the touch screen panel, respectively, and an inducting capacitance is generated at the intersection of the two ITO electrodes in different planes. The working flow thereof is as follows. An inducting signal generated by the coupling of the touch control inducting line through the inducting capacitance is detected when touch control driving signal is loaded to an ITO electrode acting as the touch control driving line. During this process, if a human body contacts the touch screen panel, a human electric field will effect on the inducting capacitance such that the capacitance value of the inducting capacitance changes, thereby changing the inducting signal generated by the coupling of the touch control inducting line. A position of the touch point can be determined based on the change of the voltage signal.

In order to save the cost, the present applicant designs a capacitive in-cell touch screen panel in which a display driving signal of some of the gate lines are loaded to the corresponding touch control driving line as a touch control driving signal and there is no need to additionally set the touch control driving line. The requirement of the precision for the coordinate position of the touch points is usually much lower than that of the displaying precision for the display panel, and thus one touch control scanning line usually corresponds to a plurality of rows of pixel. However, in order to insure that an inducting signal can be detected by the touch control inducting line, the frequency of the corresponding touch control driving signal is designed as high as possible. As a result, if a display driving signal of some of the gate lines is selected as the touch control driving signal, there is a problem that the frequency of the touch control driving signal loaded on the touch control driving line is low, which renders that it is difficult for the ITO electrode acting as the touch control inducting line to detect the inducting signal.

SUMMARY

Embodiments of the present disclosure provide a capacitive in-cell touch screen panel and a display apparatus for increasing the frequency of the touch control driving signal loaded on the touch control driving electrodes when the display driving signal of the gate lines is taken as the touch control driving signal.

Embodiments of the present disclosure provide a capacitive in-cell touch screen panel comprising a color film substrate, a thin film transistor TFT array substrate and a liquid crystal layer between the color film substrate and the TFT array substrate, a plurality of pixel units being disposed in a matrix arrangement on the capacitive in-cell touch screen panel, the capacitive in-cell touch screen panel further comprising:

at least one touch control driving electrode disposed on the TFT array substrate which extends along a row direction of the pixel units and overlaps with multiple sets of gate lines in the TFT array substrate, respectively, one set of gate lines including at least two adjacent gate lines; each of the touch control driving electrodes comprising touch control driving sub-electrodes disposed along the row direction;

a driving control unit disposed at the connection of each of the touch control driving sub-electrodes and each set of gate lines, the driving control unit being configured for delivering a display driving signal delivered by a gate line of the set of gate lines connected within the driving control unit to the touch control driving sub-electrodes as a touch control driving signal, and then outputting the touch control driving signal of the touch control driving sub-electrodes; and at least one touch control inducting electrode disposed on the color film substrate which extends along a column direction of the pixel units.

Embodiments of the present disclosure provide a display apparatus comprising the capacitive in-cell touch screen panel provided in the embodiments of present disclosure.

The beneficial effect of the present embodiments includes that:

Embodiments of the present disclosure provide the capacitive in-cell touch screen panel and the display apparatus, at least one touch control inducting electrode is disposed on the color film substrate and at least one touch control driving electrode is disposed on the TFT array substrate, each of the touch control driving electrodes overlap with multiple sets of gate lines in the TFT array substrate, respectively, one set of gate lines comprises at least two adjacent gate lines, each of the touch control driving electrodes comprises touch control driving sub-electrodes disposed along the row direction and a driving control unit is disposed at the connection of each of the touch control driving sub-electrodes and each set of gate lines, the driving control unit being configured for delivering a display driving signal delivered by a gate line of the set connected with the driving control unit to the touch control driving sub-electrodes as a touch control driving signal and then outputting the touch control driving signal of the touch control driving sub-electrodes. Since the driving control unit is able to release the display driving signal delivered by the gate line after it is loaded to the touch control driving sub-electrodes, which is equivalent to the situation where a driving pulse is loaded on the touch control driving sub-electrodes, the multiple sets of gate lines overlapping with the touch control driving electrodes input the touch control driving signal sequentially to the touch control driving electrodes through the driving control unit, and thus a plurality of driving pulses can be loaded on the same touch control driving sub-electrodes, increasing the frequency of the touch control driving signal loaded on the touch control driving electrodes when the display driving signal of the gate lines is taken as the touch control driving signal.

DETAILED DESCRIPTION

The capacitive in-cell touch screen panel and the display device provided by the embodiments of the present disclosure will be described below in detail in combination with the drawings.

The film thickness and region size of the layers in the drawings do not reflect the real scale of the TFT array substrate or the color film substrate but are only for the purpose of illustrating the content of the present disclosure.

Figure 1:
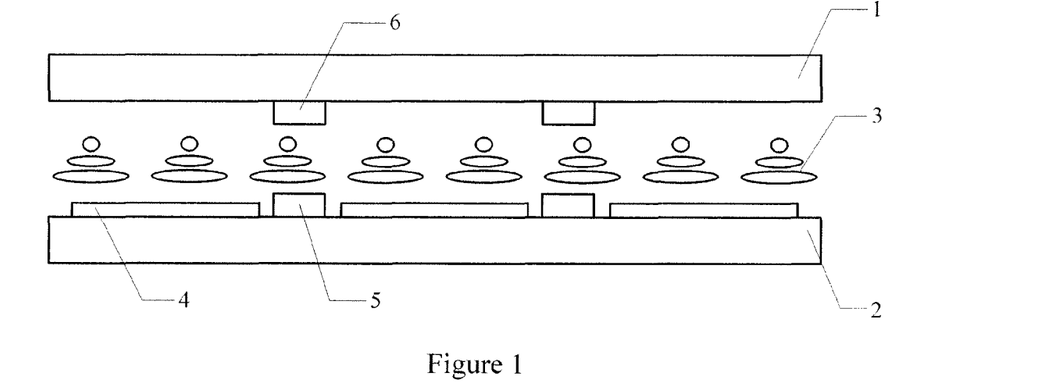
FIG. 1 is a structural schematic diagram of a capacitive in-cell touch screen panel provided in the embodiments of present disclosure.
Figure 2:
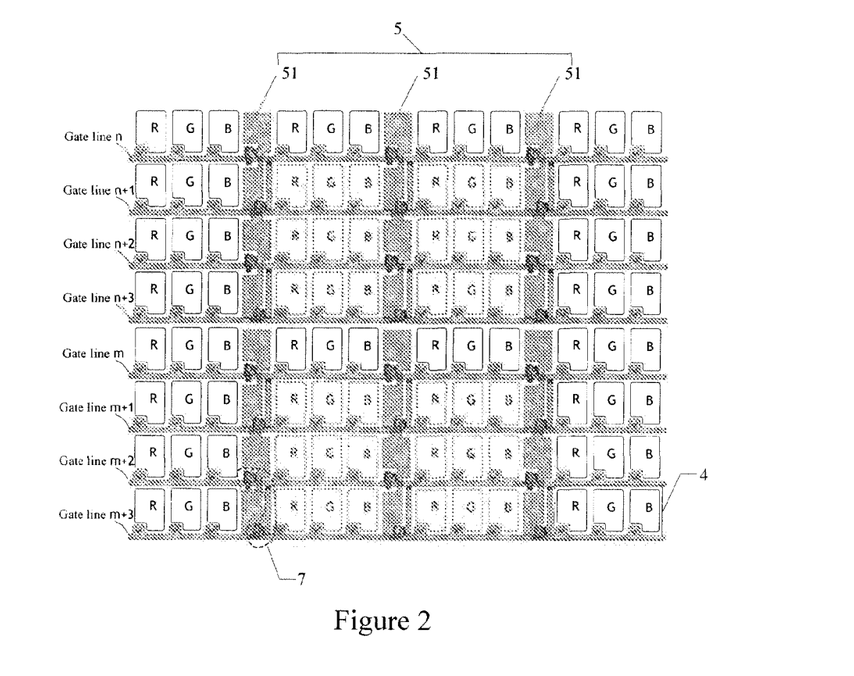
FIG. 2 is a structural schematic diagram of a TFT array substrate for the touch screen panel provided in the embodiments of present disclosure.

As shown in FIG. 1, a capacitive in-cell touch screen panel provided in an embodiment of the present disclosure comprises a color film substrate 1, a TFT array substrate 2 and a liquid crystal layer 3 between the color film substrate 1 and the TFT array substrate 2, a plurality of pixel units 4 being disposed in a matrix arrangement on the TFT array substrate 2, and further comprises:

at least one touch control driving electrode 5 on the TFT array substrate 2, a top view of the TFT array substrate 2 being shown in FIG. 2 from which it can be seen that a pixel unit 4 is consisted of three sub-pixel units RGB (that is, a pixel unit 4 on the TFT array substrate 2 corresponds to three sub-pixel units RGB) on the color film substrate, the touch control driving electrode 5 extends along the row direction of the pixel unit 4 and overlaps with multiple sets of gate lines in the TFT array substrate, each set of gate lines comprising at least two adjacent gate lines (FIG. 2 takes a set of gate lines being consisted of two adjacent gate lines as an example, such as a set of gate line n and gate line n+1); each touch control driving electrode 5 comprising touch control driving sub-electrodes 51 disposed along the row direction which are positioned between the adjacent pixel units 4, respectively;

driving control units 7 each positioned at the connection of each touch control driving electrode 51 and each set of gate lines, the driving control units 7 being used for delivering a display driving signal delivered by one gate line of the set of gate lines connected with the driving control unit 7 to the touch control driving sub-electrodes 51 as a touch control driving signal, and then outputting the touch control driving signal of the touch control driving sub-electrodes 51; and at least one touch control inducting electrode disposed 6 on the color film substrate 1, the touch control inducting electrode 6 extending along a column direction of the pixel units 4 as shown in FIG. 1.

In the touch screen panel provided in the embodiment of the present disclosure, since the driving control units are able to load the display driving signal delivered by the gate lines to the touch control driving sub-electrodes and then release it, which is equivalent to loading a driving pulse on the touch control driving sub-electrodes, so that the multiple sets of gate lines overlapping the touch control driving electrodes input touch control driving signals to the touch control driving electrodes sequentially through the driving control units, thereby a plurality of driving pulses can be loaded on the touch control driving sub-electrodes, increasing the frequency of the touch control driving signals loaded on the touch control driving electrodes when the display driving signals of the gate lines are taken as the touch control driving signals.

Figure 3:
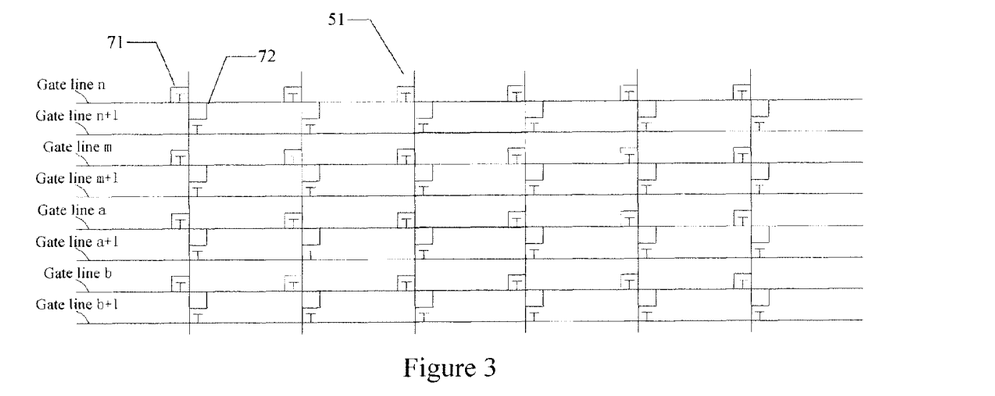
FIG. 3 is one of the structural schematic diagrams of a driving control unit of the touch screen panel provided in the embodiments of present disclosure.

In particular, as shown in FIG. 3, if each set of the gate lines includes two adjacent gate lines, for example, taking gate line n and gate line n+1 shown in FIG. 3 as one set, and so on there are four sets of gate lines connected with the touch control driving sub-electrodes 51, and then the driving control unit 7 comprises a signal input device 71 and a signal output device 72, wherein, the signal input device 71 is connected with the touch control driving sub-electrodes 51 and the first gate line of the set of gate lines (e.g. gate line n, gate line m, gate line a or gate line b as shown in FIG. 3) so as to deliver the display driving signal delivered by the first gate line to the touch control driving sub-electrodes 51 as the touch control driving signal; and the signal output device 72 is connected with the touch control driving sub-electrodes 51 and two gate lines of the set of gate lines (e.g. gate lines n and n+1, gate lines m and m+1, gate lines a and a+1, or gate lines b and b+1 as shown in FIG. 3) so as to output the touch control driving signal of the touch control driving sub-electrodes to the first gate line of the set of gate lines, when the second gate line of the set of gate lines (e.g. gate line n+1, gate line m+1, gate line a+1, or gate line b+1 as shown in FIG. 3) is delivering the display driving signal. The first gate line is at a constant low level (Vgl) when the second gate line is opened. At the same time, the current of the touch control driving signal input to the first gate line will be conducted away, which will not cause a notable fluctuation on the low level (Vgl) of the first gate line, that is, the current will not make the TFT connected with the first gate line turn on such that the signal disturbance will not occur.

In implementations, however, the number of gate lines in each set is not limited to the two gate lines as illustrated above, and can be for example three gate lines wherein there is not any connection at the overlap of the last gate line and the touch control driving sub-electrode, and the last gate line can be connected with the touch control driving sub-electrode through the driving control unit 7. For example, in addition to the signal input device 71 and signal output device 72, the driving control unit 7 may include another signal output device which is connected with the touch control driving sub-electrode and the second and the last gate lines of the set of gate lines so as to output the touch control driving signal of the touch control driving sub-electrode to the second gate line of the set of gate lines when the last gate line of the set is delivering the display driving signal. It can be seen that the frequency of the touch control signal loaded on the touch control driving sub-electrode 51 is lower in the implementation with three gate lines as one set than that in the implementation with two gate lines as one set. Therefore the implementation with two gate lines as one set is usually employed in order to increase the frequency of the touch control driving signal as much as possible.

Figure 4:
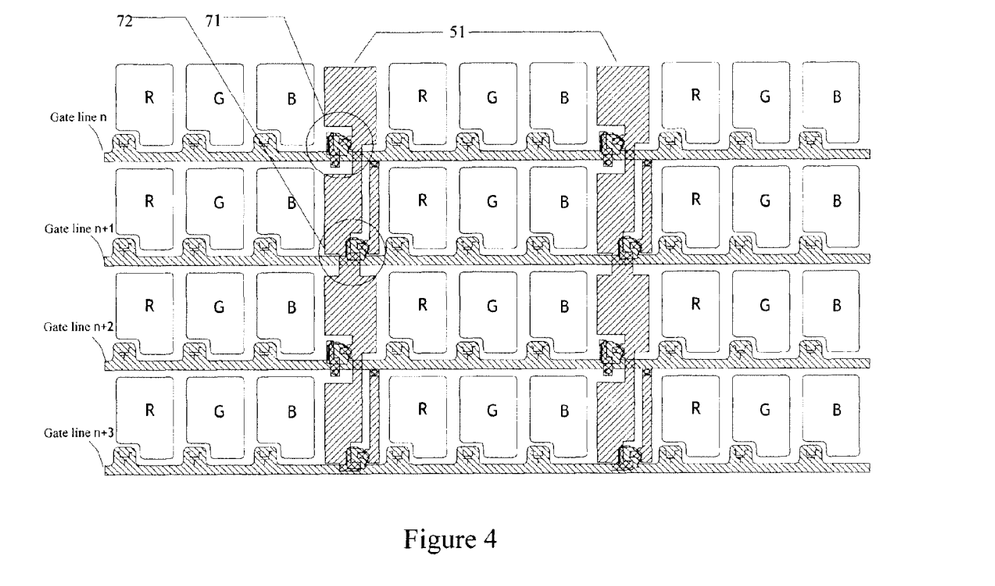
FIG. 4 is the other one of the structural schematic diagrams of a driving control unit of the touch screen panel provided in the embodiments of present disclosure.

In implementations, as shown in FIG. 4, the signal input device 71 and signal output device 72 may be two TFT switches, that is, the signal input device 71 may be a first TFT device and the signal output device 72 may be a second TFT device; wherein, a gate and a source of the first TFT device are connected with the first gate line of the set of gate lines (e.g. gate line n or gate line n+2 as shown in FIG. 4), and a drain thereof is connected with the touch control driving sub-electrode 51; as such, when the display driving signal is loaded on the first gate line, the first TFT device is turned on such that the display driving signal of the first gate line is loaded to the touch control driving sub-electrode 51 as the touch control driving signal, making the touch control driving sub-electrode 51 at a high level;

a gate of the second TFT device is connected with the second gate line of the set of gate lines (e.g. gate line n+1 or gate line n+3 as shown in FIG. 4), a source thereof is connected with the touch control driving sub-electrode, and the drain thereof is connected with the first gate line of the set of gate lines; as such, after the display driving signal is loaded on the first gate line and when the display driving signal is loaded on the second gate line, the second TFT device is turned on such that the touch control driving signal loaded on the touch control driving sub-electrode 51 by the first gate line is released on the first gate line, making the touch control driving sub-electrode 51 at a low level.

In implementations, the touch control driving sub-electrode and the source and drain in the TFT array substrate can be disposed in the same layer. That is, the patterns of the source and drain of the TFT and the touch control driving sub-electrode are fabricated simultaneously in a patterning process, and thus no new patterning process will be added in the fabricating process for the TFT array substrate, and the cost for manufacturing the TFT array substrate as the touch screen panel will not be increased, either.

In particular, since the touch control driving sub-electrode in each of the touch control driving electrodes is disposed at the gaps between the pixel units, the width of each of the touch control driving sub-electrode will not be larger than the gap between the adjacent columns of pixel units. In implementations, the width of each of the touch control driving sub-electrode may be set to be substantially the same as the width of the RGB sub-pixels.

In general, the precision of the touch screen panel is usually in the order of millimeter, while the precision of the liquid crystal is usually in the order of micrometer. The precision of the touch screen panel relies on the length of the touch control driving sub-electrode, that is, the length of touch control driving sub-electrode can be selected in accordance with the required touch control precision. Consequently, the length of each of touch control driving sub-electrodes will span multiple columns of pixel units of the liquid crystal display, and is usually above 2 mm. As such, each of the touch control driving sub-electrodes overlaps with multiple gate lines providing the display driving signal for the TFT in the TFT array substrate, and a parasitic capacitance is generated at the overlap thereof. The larger the area of the overlap is, the larger the parasitic capacitance is. The parasitic capacitance may incur the bad quality defects such as green pictures, line residual images and so on, which will be more obvious as the size of the panel increases.

Accordingly, in the implementations, in order to reduce the area of the overlap of the touch control driving sub-electrodes and the gate lines, the parasitic capacitance is reduced. As shown in FIG. 4, each of the touch control driving sub-electrodes 51 may be a plurality of driving point electrodes which are electrically connected and are adjacent to each other in the column direction. The driving point electrodes are positioned between the adjacent column pixel units in each of the rows and are connected with each other through leads. FIG. 4 illustrates an example of a touch control driving sub-electrode 51 being consisted of four driving point electrodes. In this case, the area of the overlap of the leads and the gate lines is small and thus the generated parasitic capacitance can be reduced as much as possible.

In specific implementations, the touch control inducting electrode on the color film substrate can be positioned between the substrate and the colored resin of the colored film substrate or positioned on the side of the colored resin of the color film substrate facing the liquid crystal layer.

Figure 5A:
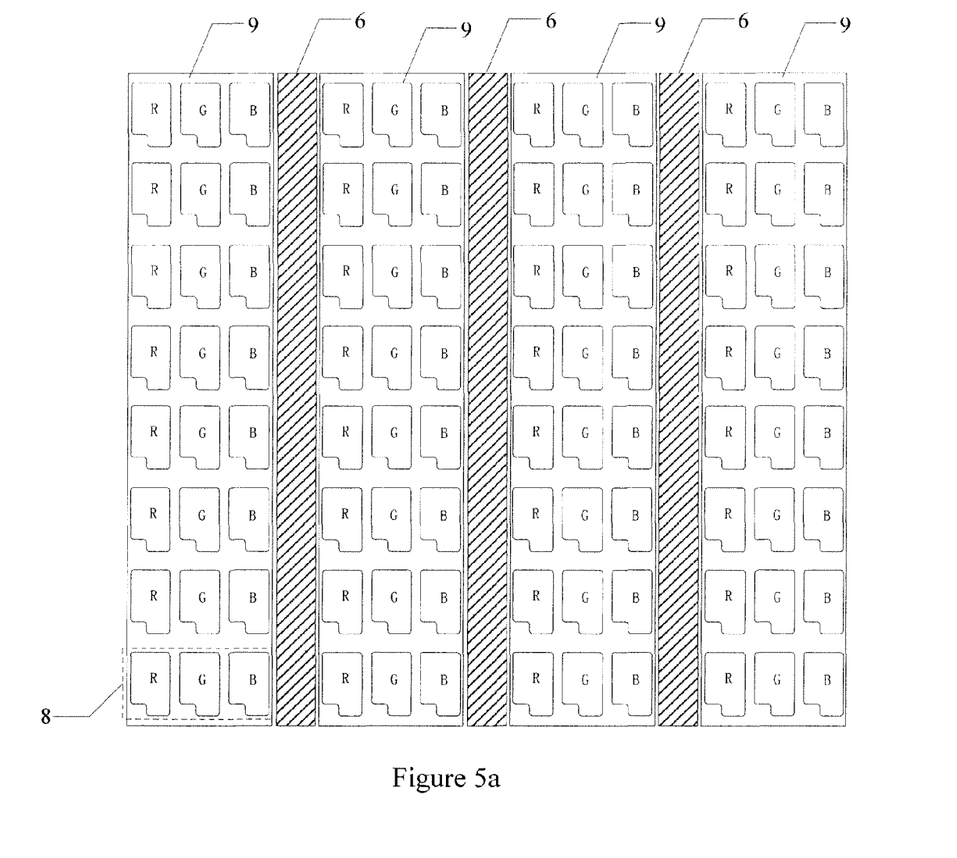
FIGS. 5a-5c are structural schematic diagrams of color film substrate of the touch screen panel provided in the embodiments of present disclosure.
Figure 5B:
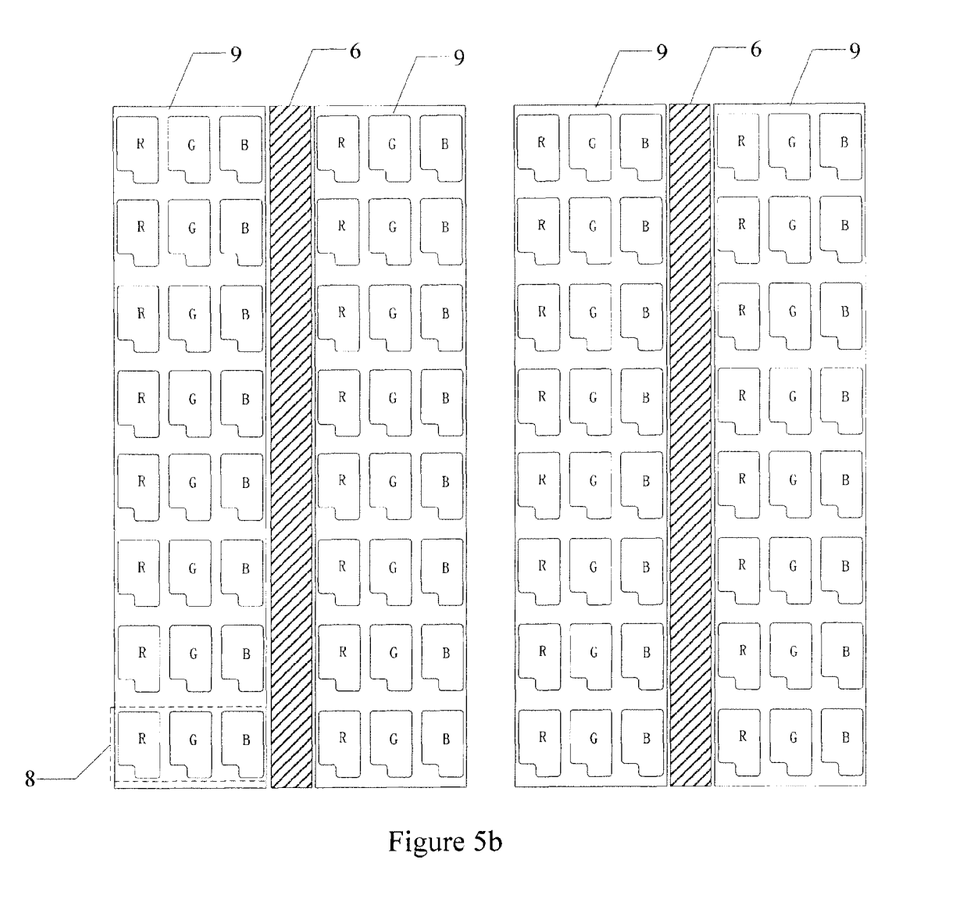

In general, there are color filtering units on the color film substrate corresponding to the pixel units of the TFT array substrate, which are also consisted of three sub color filtering units R, G and B. Since the touch control inducting electrodes are wired along the column direction of the pixel units, in specific, the region of the projection of the touch control inducting electrodes on the TFT array substrate can be entirely covered between the adjacent columns of the pixel units or partially cover this gap; that is, the touch control inducting electrodes on the color film substrate exactly corresponds to the gap region between the adjacent columns of the pixel units on the TFT array substrate, or to a part of this gap region in spatial positions. As shown in FIG. 5a, the touch control inducting electrodes 6 can be entirely disposed between the color filtering units 8 of the adjacent columns on the color film substrate, or in option, can be disposed between part of the adjacent columns of the color filtering units 8 as shown in FIG. 5b. For example, a touch control inducting electrodes 6 is disposed at a gap of every other column of the color filtering units 8, details omitted here. In the practical manufacturing process, the distribution density of the touch control inducting electrodes 6 can be set in accordance with the requirement of the touch control precision.

Furthermore, the shielding electrodes, which are fabricated on the side of the color film substrate backing against the liquid crystal layer in the prior art, can be fabricated on the side of the color film substrate facing the liquid crystal layer, which facilitates the thinning process performed on the coupled board after the color film substrate and the TFT array substrate are coupled, that is, the substrate exposed outside is etched with particular liquid. In specific, the shielding electrodes can be disposed between the substrate and the colored resin of the color film substrate, or disposed at the side of the colored resin facing the liquid crystal layer in the color film substrate. In implementations, the common electrode signal is input to the shielding electrode through the common electrode line electrically connected to the shielding electrode so as to shield the interference from the external signals. Preferably, manufacturing the shielding electrode between the substrate and the colored resin of the color film substrate is more advantageous for the shielding electrode to shield the interference from the external signals.

Furthermore, the shielding electrodes which are fabricated entirely in a layer in the prior art is optimized into the strip-shaped shielding electrodes, and the projection area of one shielding electrode strip on the TFT array substrate entirely covers a column of pixel units. That is, as shown in FIGS. 5a and 5b, on the color film substrate, a shielding electrode strip 9 covers a column of color filtering units 8 consisted of RGB. As such, when the projection area of each of the touch control inducting electrode strips on the TFT array substrate entirely or partially covers the gap between the adjacent columns of the pixel units, since the patterns of the shielding electrodes 9 and the touch control inducting electrodes 6 are not overlapped with each other as shown in FIG. 5a and FIG. 5b, the shielding electrodes and the touch control inducting electrodes can also be disposed in the same layer. Of course, the shielding electrodes and the touch control inducting electrodes can be disposed in different layers of the color film substrate and the present disclosure is not limited thereto.

Figure 5C:
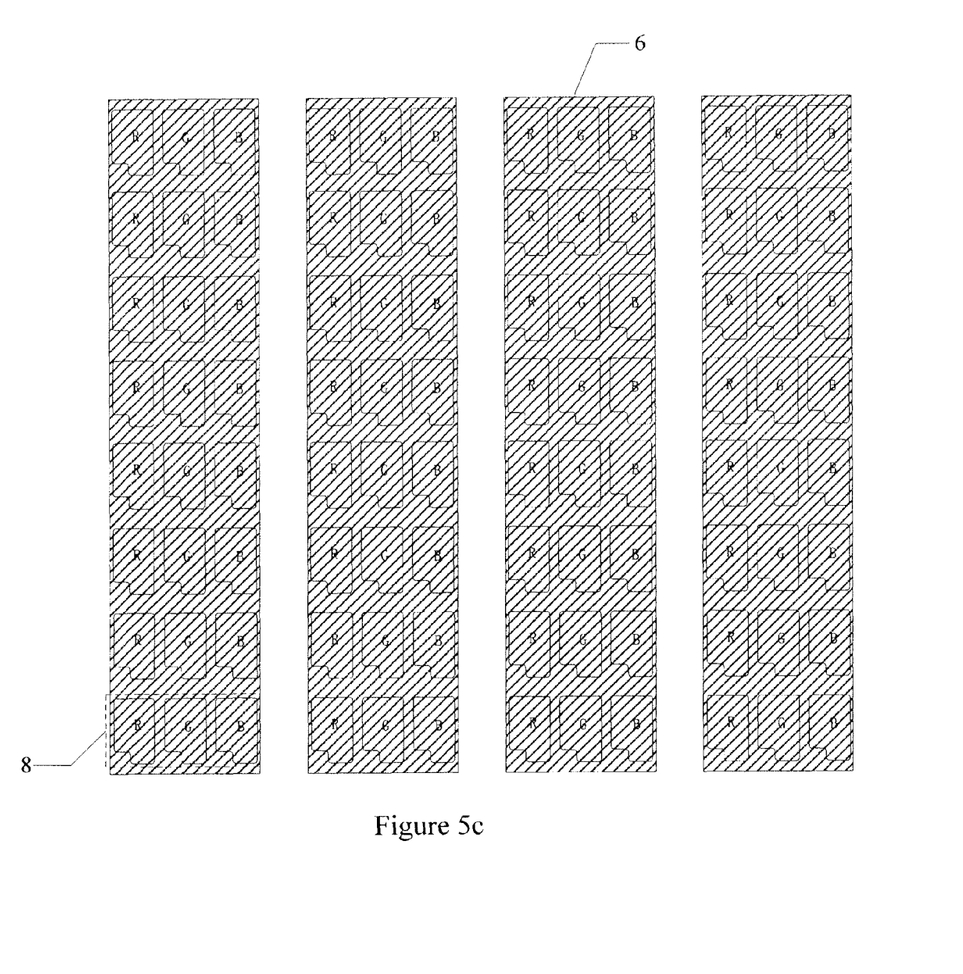

Furthermore, in addition to the disposition wherein the projection area of each of the touch control inducting electrode strips on the TFT array substrate entirely or partially covers the gap between the adjacent columns of the pixel units, the projection area of each of the touch control inducting electrode strips can also cover a column of pixel units. That is, as shown in FIG. 5c, a touch control inducting electrode 6 covers a column of color filtering units in which case the common electrode signal can be loaded to the touch control inducting electrode 6 at the same time, serving as shielding electrodes and omitting the shielding electrodes.

Figure 6:
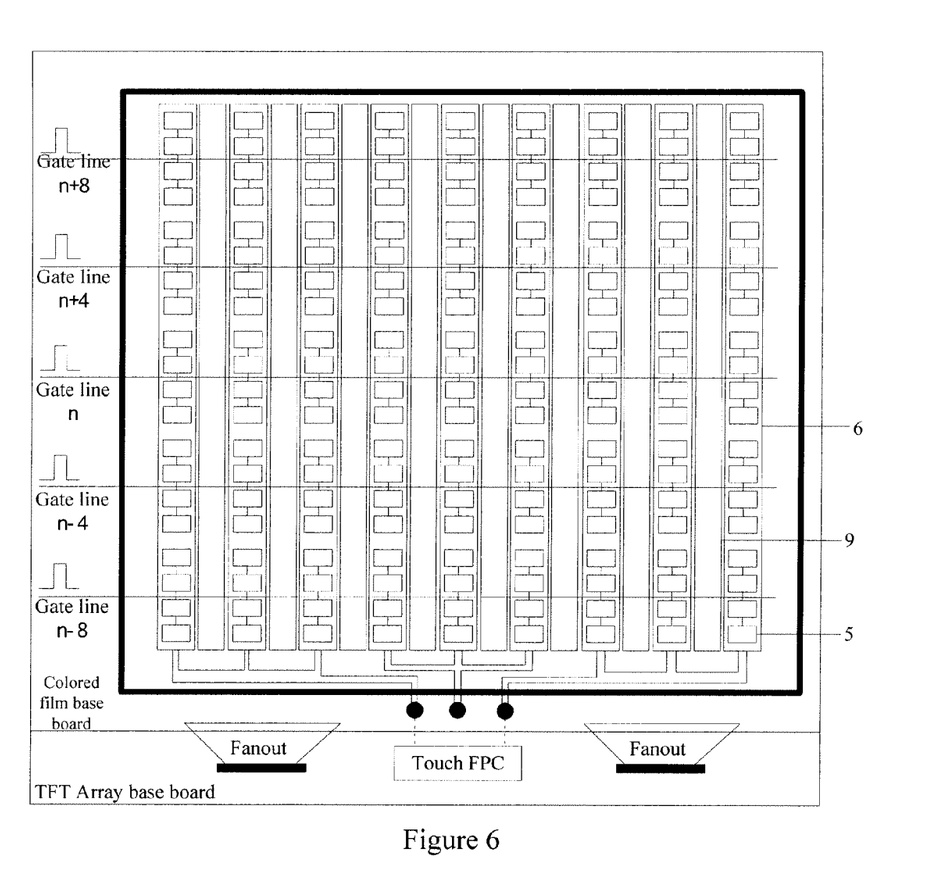
FIG. 6 is a schematic diagram of the connection relationship of the touch control inducting lines provided in the embodiments of present disclosure.

Accordingly, since the precision of the touch screen panel is usually in the order of millimeter and that of the liquid crystal display is usually in the order of micrometer, a plurality of adjacent touch control inducting electrodes can be used as a touch control inducting electrode strip. In implementations, M adjacent touch control inducting lines can be connected at either end through leads according to the required touch control precision so as to be used as a touch control inducting electrode strip. An example in which three touch control inducting strips 6 are connected at one end through the leads is shown in FIG. 6. After the three touch control inducting strips 6 are conducted to be one touch control inducting electrode strip, it is connected with the Touch FPC by using the sealant in the fanout area of the color film substrate, thereby reducing the wiring in the fanout area.

Base on the same inventive conception, there is also provided a display apparatus in an embodiment of present disclosure comprising the capacitive in-cell touch screen panel provided in the above embodiments. Please refer to the embodiments of the capacitive in-cell touch screen described above for those of the display apparatus and the repetition is omitted.

In the capacitive in-cell touch screen panel and the display apparatus provided in the embodiments of present disclosure, at least one touch control inducting electrode is disposed on the color film substrate and at least one touch control driving electrode is disposed on the TFT array substrate. Each of the touch control driving electrodes overlaps with multiple sets of gate lines in the TFT array substrate, respectively, wherein one set of gate lines comprises at least two adjacent gate lines, each of the touch control driving electrodes comprises touch control driving sub-electrodes disposed along the row direction and a driving control unit is disposed at the connection of each of the touch control driving sub-electrodes and each set of gate lines. The driving control unit is configured for delivering a display driving signal delivered by a gate line of the set connected with the driving control unit to the touch control driving sub-electrodes as a touch control driving signal and then outputting the touch control driving signal of the touch control driving sub-electrodes. Since the driving control unit is able to release the display driving signal delivered by the gate line after it is loaded to the touch control driving sub-electrodes, which is equivalent to the situation where a driving pulse is loaded on the touch control driving sub-electrodes, the multiple sets of gate lines overlapping with the touch control driving electrodes input the touch control driving signal sequentially to the touch control driving electrodes through the driving control unit, and thus a plurality of driving pulses can be loaded on the touch control driving sub-electrodes, increasing the frequency of the touch control driving signal loaded on the touch control driving electrodes when the display driving signal of the gate lines is taken as the touch control driving signal.

It is obvious that various changes and variations can be made to the present embodiments by those skilled in the art without departing from the spirit and scope of present disclosure. As such, it is intended such changes or variations are included in the present disclosure if they belongs to the scope of the present claims and the equivalents thereof.

What is claimed is:

1. A capacitive in-cell touch screen panel, comprising: a color film substrate, a thin film transistor TFT array substrate and a liquid crystal layer between the color film substrate and the TFT array substrate, a plurality of pixel units being disposed in a matrix arrangement on the capacitive in-cell touch screen panel, the touch screen panel further comprising:
    at least one touch control driving electrode disposed on the TFT array substrate which is disposed along a row direction of the pixel units and overlaps with multiple sets of gate lines in the TFT array substrate, respectively, one set of gate lines including at least two adjacent gate lines, each of the touch control driving electrodes comprising touch control driving sub-electrodes disposed along the row direction;
    a driving control unit disposed at the connection of each of the touch control driving sub-electrodes and each set of gate lines, the driving control unit being configured for delivering a display driving signal delivered by a gate line of the set of gate lines connected with the driving control unit to the touch control driving sub-electrodes as a touch control driving signal and then outputting the touch control driving signal of the touch control driving sub-electrodes; and
    at least one touch control inducting electrode disposed on the color film substrate which extends along a column direction of the pixel units.

2. The touch screen panel according to claim 1, wherein each set of the gate lines comprises two adjacent gate lines, and the driving control unit comprises a signal input device and a signal output device, wherein,
    the signal input device is configured for delivering a display driving signal delivered by a first gate line to the touch control driving sub-electrodes as a touch control driving signal; and
    the signal output device is configured for outputting the touch control driving signal of the touch control driving sub-electrodes to the first gate line of said set of gate lines when a second gate line of said set of gate lines delivers the display driving signal.

3. The touch screen panel according to claim 2, wherein the signal input device is a first TFT device and the signal output device is a second TFT device, wherein, a gate and a source of the first TFT device are connected with the first gate line of said set of gate lines and a drain thereof is connected with the touch control driving sub-electrode;

a gate of the second TFT device is connected with the second gate line of said set of gate lines, a source thereof is connected with the touch control driving sub-electrode, and a drain thereof is connected with the first gate line of said set of gate lines.

4. The touch screen panel according to claim 1, wherein the touch control driving sub-electrode and the sources and the drains of the TFTs in the TFT array substrate are disposed in the same layer.

5. The touch screen panel according to claim 1, wherein each of the touch control driving sub-electrodes comprises a plurality of driving point electrodes which are electrically connected and are adjacent to each other in the column direction, the driving point electrodes being positioned between the adjacent columns of pixel units in each of the rows.

6. The touch screen panel according to claim 1, wherein the touch control inducting electrode is positioned between the substrate of the color film substrate and the colored resin thereof, or positioned on a side of a colored resin of the color film substrate facing the liquid crystal layer.

7. The touch screen panel according to claim 6, wherein a projection area of each of the touch control inducting electrodes on the TFT array substrate covers a column of pixel units.

8. The touch screen panel according to claim 6, wherein a projection area of each of the touch control inducting electrodes on the TFT array substrate entirely or partially covers a gap between the adjacent columns of the pixel units.

9. The touch screen panel according to claim 8, wherein the color film substrate further comprises shielding electrodes which are positioned between a substrate of the color film substrate and a colored resin thereof, or positioned on a side of the colored resin of the color film substrate facing the liquid crystal layer,
wherein a projection area of one shielding electrode on the TFT array substrate entirely covers a column of pixel units.

10. The touch screen panel according to claim 9, wherein the shielding electrodes and the touch control driving electrodes are disposed in the same layer.

11. The touch screen panel according to claim 6, wherein a plurality of adjacent touch control inducting lines are connected at either end through leads.

12. A display apparatus comprising the capacitive in-cell touch screen panel comprising: a color film substrate, a thin film transistor TFT array substrate and a liquid crystal layer between the color film substrate and the TFT array substrate, a plurality of pixel units being disposed in a matrix arrangement on the capacitive in-cell touch screen panel, the touch screen panel further comprising:
at least one touch control driving electrode disposed on the TFT array substrate which is disposed along a row direction of the pixel units and overlaps with multiple sets of gate lines in the TFT array substrate, respectively, one set of gate lines including at least two adjacent gate lines, each of the touch control driving electrodes comprising touch control driving sub-electrodes disposed along the row direction;
a driving control unit disposed at the connection of each of the touch control driving sub-electrodes and each set of gate lines, the driving control unit being configured for delivering a display driving signal delivered by a gate line of the set of gate lines connected with the driving control unit to the touch control driving sub-electrodes as a touch control driving signal and then outputting the touch control driving signal of the touch control driving sub-electrodes; and
at least one touch control inducting electrode disposed on the color film substrate which extends along a column direction of the pixel units.

13. The display apparatus according to claim 12, wherein each set of the gate lines comprises two adjacent gate lines, and the driving control unit comprises a signal input device and a signal output device, wherein,
the signal input device is configured for delivering a display driving signal delivered by a first gate line to the touch control driving sub-electrodes as a touch control driving signal; and
the signal output device is configured for outputting the touch control driving signal of the touch control driving sub-electrodes to the first gate line of said set of gate lines when a second gate line of said set of gate lines delivers the display driving signal.

14. The display apparatus according to claim 13, wherein the signal input device is a first TFT device and the signal output device is a second TFT device, wherein,
a gate and a source of the first TFT device are connected with the first gate line of said set of gate lines and a drain thereof is connected with the touch control driving sub-electrode;
a gate of the second TFT device is connected with the second gate line of said set of gate lines, a source thereof is connected with the touch control driving sub-electrode, and a drain thereof is connected with the first gate line of said set of gate lines.

15. The display apparatus according to claim 12, wherein the touch control driving sub-electrode and the sources and the drains of the TFTs in the TFT array substrate are disposed in the same layer.

16. The display apparatus according to claim 12, wherein each of the touch control driving sub-electrodes comprises a plurality of driving point electrodes which are electrically connected and are adjacent to each other in the column direction, the driving point electrodes being positioned between the adjacent columns of pixel units in each of the rows.

17. The display apparatus according to claim 12, wherein the touch control inducting electrode is positioned between the substrate of the color film substrate and the colored resin thereof, or positioned on a side of a colored resin of the color film substrate facing the liquid crystal layer.

18. The display apparatus according to claim 17, wherein a projection area of each of the touch control inducting electrodes on the TFT array substrate covers a column of pixel units.

19. The display apparatus according to claim 17, wherein a projection area of each of the touch control inducting electrodes on the TFT array substrate entirely or partially covers a gap between the adjacent columns of the pixel units.

20. The display apparatus according to claim 19, wherein the color film substrate further comprises shielding electrodes which are positioned between a substrate of the color film substrate and a colored resin thereof, or positioned on a side of the colored resin of the color film substrate facing the liquid crystal layer,
wherein a projection area of one shielding electrode on the TFT array substrate entirely covers a column of pixel units.

* * * * *